H. E. WOLCOTT.
Wagon Spring.

No. 108,745. Patented Oct. 25, 1870.

Witnesses:
Chas Kelly
D. W. Van Valkenburgh

Inventor:
Henry E. Wolcott

United States Patent Office.

HENRY E. WOLCOTT, OF ELBRIDGE, NEW YORK, ASSIGNOR TO HIMSELF AND RUSSELL B. WHEELER, OF SAME PLACE, AND EZEKIEL B. HOYT, OF SKANEATELES, NEW YORK.

Letters Patent No. 108,745, dated October 25, 1870.

IMPROVEMENT IN SPRINGS FOR VEHICLES.

The Schedule referred to in these Letters Patent and making part of the same.

*To whom it may concern:*

Be it known that I, HENRY E. WOLCOTT, of the town of Elbridge, in the county of Onondaga and State of New York, have invented a new and useful Spring, and the mode of attaching the same, for a lumber-wagon, which consists of four pieces of rubber, one of each being placed upon each end of the two bolsters, the upper ends of the rubbers being sunken in bars which extend from stake to stake, and notching upon the same, and firmly secured by bolts, and upon which bars the box of the wagon rests. The effect will be to lessen friction, thus prolonging the use and existence of the wagon. The noisy rattle, always a nuisance, will be obviated.

I would respectfully refer to the annexed drawing, which makes a part of this specification, to wit:

Figure 1:
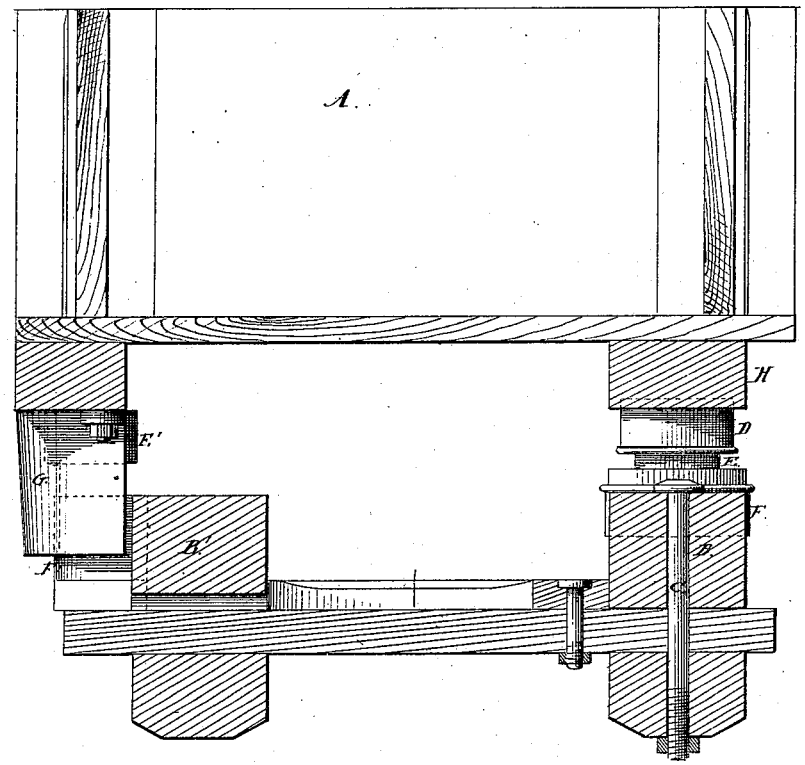
Figure 1 represents the longitudinal vertical section of wagon-box, cross-bar, spring, and bolster.
Figure 2:
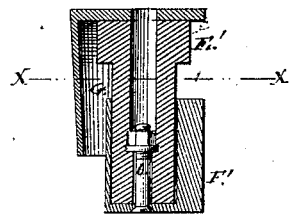
Figures 2 and 4 represent a transverse vertical section of the cups and springs.
Figure 3:
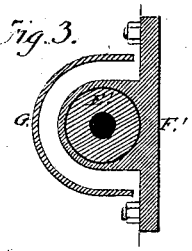
Figures 3 and 5 represent a plan view of the cups and springs.
Figure 4:
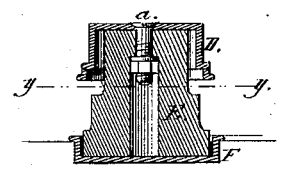
Figure 5:
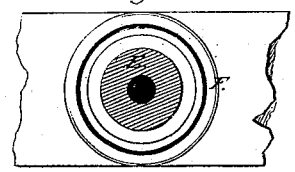

A represents the wagon-box.
B represents bolster over the front axle.
B' represents bolster over the back axle.
C represents bolt to secure the bolster and front axle together.

D represents the metal socket or cup which receives the wagon-box.
E represents the rubber spring over the front axle.
E' represents the rubber spring over the back axle.
F represents the socket or cup forming base for the spring over front axle.
F' represents the socket to which is secured the spring over back axle.
G represents the socket-guide which surrounds the spring over the back axle.
H represents the false bolster.
*a* represents the bolt which screws the spring E to the socket D.
*b* represents the bolt securing the spring E to the socket F'.

I do not claim rubber springs broadly.

What I claim is—

The combination of flanged and perforated rubber springs, secured, by means of bolts and nuts, to the sockets, and attached to the bolster and bed-plate, substantially as described, for the purpose set forth.

HENRY E. WOLCOTT.

Witnesses:
CHAS. KELLY,
D. W. VAN VALKENBURGH.